H. F. McGRATH.
NUT LOCK.
APPLICATION FILED AUG. 11, 1916.
1,305,729.
Patented June 3, 1919.
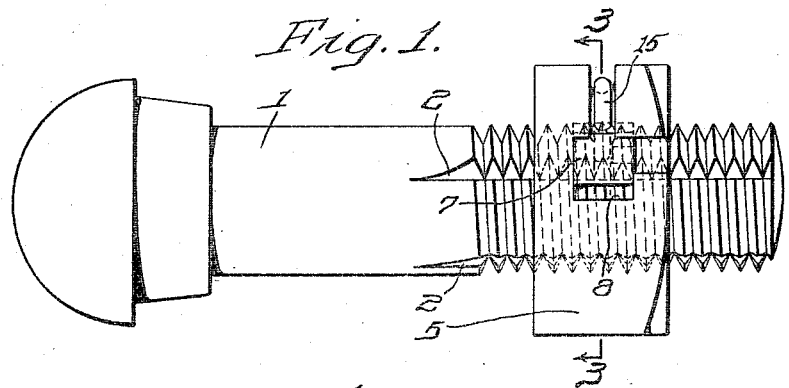
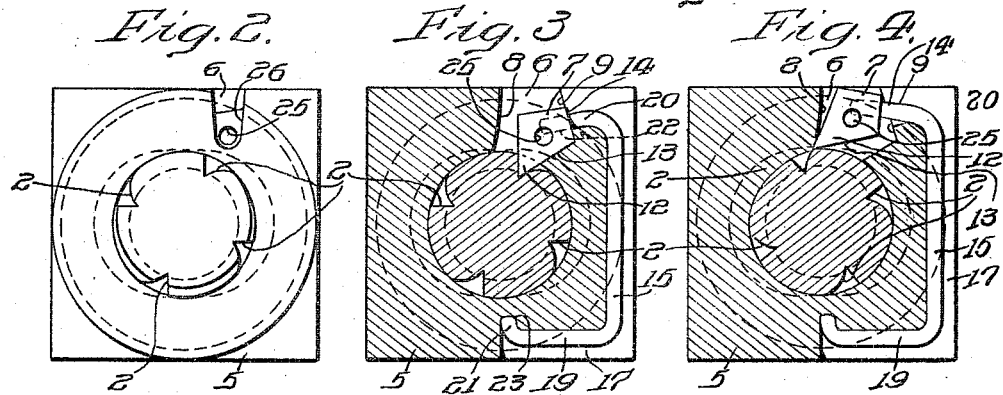
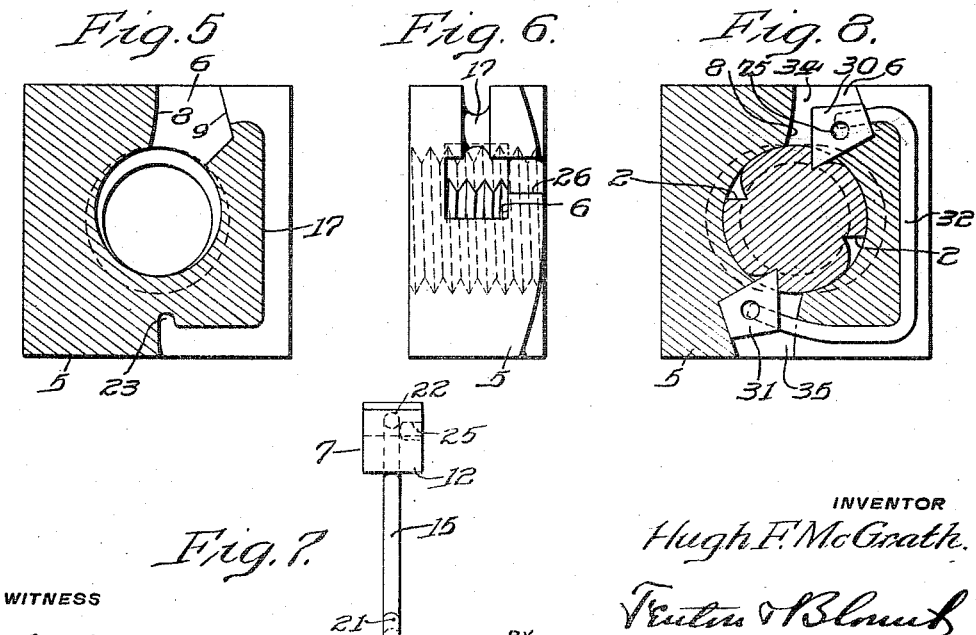
WITNESS
F. J. Hartman.
INVENTOR
Hugh F. McGrath.
BY
Venter & Blount
ATTORNEYS

UNITED STATES PATENT OFFICE.

HUGH F. McGRATH, OF PHILADELPHIA, PENNSYLVANIA.

NUT-LOCK.

1,305,729.            Specification of Letters Patent.     Patented June 3, 1919.

Application filed August 11, 1916. Serial No. 114,331.

*To all whom it may concern:*

Be it known that I, HUGH F. MCGRATH, a citizen of the United States, and a resident of the city of Philadelphia, county of Philadelphia, and State of Pennsylvania, have invented certain new and useful Improvements in Nut-Locks, of which the following is a specification, reference being had to the accompanying drawing.

A principal object of my invention is to provide a locking device of simple and economical construction which will serve to securely hold a nut in position upon a bolt and which will not interfere with the convenient attachment of the nut to the bolt and will permit the nut to be readily disengaged from the bolt when desired.

Further objects of my invention are to provide a locking device having the foregoing characteristics and so arranged that when in operation the force required to prevent the separation of the nut and bolt shall be exerted in a direction substantially radially of the bolt rather than tangentially thereof whereby substantially no additional duty is imposed on the threads of the bolt by reason of the use or operation of the locking device.

Still further objects of my invention are to provide a nut lock which is automatic in operation; which is self-contained and will not interfere with the adjustment of the nut on the bolt with an ordinary wrench; which comprises but few parts and those of simple design and construction and which is not liable to get out of order.

My invention further includes all of the other various novel objects and features of construction and arrangement hereinafter more definitely specified and described.

In the accompanying drawings in which are shown certain forms of my invention, Figure 1 is a side elevation of a bolt carrying a nut and showing a preferred embodiment thereof; Fig. 2 an end view of the bolt and nut shown in Fig. 1; Fig. 3, a section taken on line 3, 3 in Fig. 1 and showing the parts of the invention in one position, and Fig. 4 a similar view showing the parts in another position. Fig. 5 is a sectional view of the nut separated from the bolt with certain portions of the locking mechanism removed; Fig. 6 a side elevation of the nut shown in Fig. 5 and Fig. 7 an elevational view showing a detail of the invention. In Fig. 8 is illustrated a slightly modified form of the invention, said figure being a view corresponding to Fig. 3 and showing the parts in corresponding operative positions.

Referring now more especially to that form of the invention illustrated in Figs. 1 to 7 inclusive the same comprises a bolt 1 which may be of any desired construction and which is provided with a plurality of longitudinally extending grooves 2 formed preferably only in the threaded portion thereof, which grooves may be of any desired number and arranged in any desired manner about the periphery of the bolt, the bolt shown in the drawing comprising four grooves equidistantly spaced about its periphery. While the form of the grooves may be varied as desired I prefer to make them substantially V-shaped and slightly deeper than the threads, and on a bolt having a right-hand thread to form that wall of each groove away from which the nut is turned when being screwed on to the bolt substantially flat, and to slightly curve the other wall of each groove toward the direction in which the nut is turned when being screwed on to the bolt for the purpose to be hereinafter described. Furthermore, I prefer to offset or form the flat wall of each groove at an angle with the radial line of the bolt as clearly shown in the drawings so that the point of each V-shaped groove will be directed substantially toward the axis of the bolt.

The nut 5 which may be of any desired external form, that shown in the drawings being a square nut, although the invention is equally adapted for use in connection with hexagonal or other forms of nuts, is internally threaded for engagement with the bolt in the ordinary manner and is provided with an aperture 6 extending through the wall of the nut, suitable for the reception of a dog 7 hereinafter more particularly described. The front wall 8 of the aperture may extend substantially radially of the nut or may be slightly curved or undercut as shown in the drawings to afford room for the toe of the dog during its operative movement as hereinafter described while the opposite or rear wall 9 of the aperture is considerably undercut from the outer surface of the nut and is then directed inwardly toward the center opening in the nut whereby the two portions of the wall form the sides of a rather blunt V.

The dog 7 comprises a toe 12 adapted for engagement in the grooves 2 of the bolt and formed between the face 13 of the dog which face is arranged to be normally maintained substantially normal to the tangent of the central aperture in the nut at its point of intersection with said face and the face 14 adapted for engagement with the wall 9 of the aperture in the nut, and for the purpose of positioning the dog with respect to the nut, a spring 15 preferably formed of spring wire is provided and adapted to rest in a groove 17 formed peripherally around two or more sides of the nut. The spring is preferably provided with a pair of arms 19 and 20 the former having a toe 21 at its extremity adapted to engage in a depression 23 adjacent the end of the groove and the other arm 20 being bent slightly inwardly and arranged to engage in a suitable aperture or recess 22 formed in dog 7 and extending inwardly from face 14 thereof in such manner that when the various parts are assembled the spring will serve to constantly depress the dog toward the central threaded opening in the nut so that the toe of the dog will normally project slightly beyond the surface of the threads in the interior of the nut when the latter is removed from the bolt and will therefore be operative to engage the grooves 2 in the bolt when the nut is positioned thereon as best shown in Figs. 1, 2 and 3.

For the purpose of lifting the dog out of engagement with the grooves in the bolt to permit the nut to be backed off of the bolt, the dog may be provided with a transversely extending aperture 25 and the wall of the nut cut away adjacent aperture 6 to form a substantially V-shaped slot 26 sufficiently deep to expose aperture 25 to permit the insertion of a suitable tool therein by means of which, when desired, the dog may be lifted out of engagement with the grooves in the bolt.

In operation, the bolt may first be inserted in the nut and the latter screwed up upon the bolt in the ordinary manner. When the nut has traveled along the bolt sufficiently to permit its end to engage the toe of the dog, the latter will ride upon the surface of the bolt as shown in Fig. 4 until one of the grooves is brought beneath the toe of the dog when the spring 15 immediately acts to force the dog down into the groove to assume the position shown in Fig. 3. The further rotation of the nut will again cause the dog to rise to the position of Fig. 4, the slightly curved surface of the adjacent wall of the groove assisting in effecting this operation smoothly and without undue friction, and it will be evident that this alternate rising and falling movement of the dog will continue as long as the nut is being screwed up upon the bolt. As soon, however, as the rotation of the nut is stopped at such point that the dog will register with one of the grooves as shown in Fig. 3, the nut will be prevented from rotation in the opposite direction by the engagement of the flat wall of the groove with the front face of the dog and the nut thus securely locked on the bolt. Moreover, it will be evident that any force tending to back the nut off the bolt will press the wall 9 of aperture 6 against the adjacent face 14 of the dog and in turn tend to drive the dog substantially toward the axis of the bolt instead of tangentially thereof so that the threads of the bolt are relieved from the pressure of the dog under such conditions and stripping of, or wear upon, the threads in consequence averted. Moreover, once the dog and spring have been assembled upon the nut, which operation is easily accomplished by introducing the dog with spring 15 in position as shown in Fig. 7, through the mouth of the aperture 6 and then forcing the spring into groove 17 until the toe 21 snaps into recess 23 at the end of the groove, the dog and spring will be held in operative relation with the nut without becoming disengaged therefrom during transportation or rough handling. Furthermore, when desired the nut may be screwed on to the bolt by the use of an ordinary wrench adapted for a nut of that size as at no time during this operation will the dog or spring rise above or extend beyond the surfaces of the nut, while by lifting the dog out of engagement with the grooves in the bolt by means of a suitable tool as hereinbefore described the nut may be readily unscrewed from the bolt and thereafter utilized upon another bolt if desired, the nut being capable of repeated use.

In Fig. 8 I have illustrated a slightly modified form of the invention in which a pair of dogs 30 and 31 are utilized and arranged to be operated by means of a single spring 32. In this form of the invention the nut is provided with a pair of apertures 34, 35 each preferably similar to the aperture 6 already described and adapted for the reception of the respective dogs which are turned in opposite directions so that their toes will simultaneously engage diametrically opposed grooves in the bolt when the dogs are depressed and will ride upon diametrically opposed portions of the bolt threads when they are raised. It is thought that the structure and operation of this form of the invention will be evident without further description.

While I have herein illustrated and described certain embodiments of my invention with considerable particularity I do not thereby desire or intend to limit myself specifically thereto as suitable changes and modifications may be made in the details of construction and arrangement of the various parts of the invention without departing from the spirit and scope of the invention as defined in the appended claims.

Having thus described my invention I claim and desire to protect by Letters Patent of the United States:—

1. In a nut lock, the combination with a bolt having a longitudinal groove, of a recessed nut, a dog adapted to engage said groove positioned in said recess, means to constantly depress said dog and means operative to force said dog toward the axis of said bolt when pressure tending to unscrew said nut from said bolt is brought to bear on said nut.

2. In a nut lock, the combination with a bolt having a longitudinally extending groove, of a nut adapted to engage said bolt and having a recess in its wall, a dog adapted to engage said groove positioned in said recess and adapted to coact with the wall thereof and a spring operative to constantly depress said dog, said nut being operative to force said dog toward the center of said bolt when pressure is applied to said nut to unscrew it from said bolt.

3. In a nut lock, the combination with a bolt having longitudinal grooves, one wall of each of said grooves being flat and the other wall curved, of a nut adapted to coöperate with said bolt having an aperture in its wall, a dog positioned in said aperture and adapted to engage said grooves consecutively and ride on said curved walls as said nut is screwed on said bolt, means to normally maintain said dog in contact with said bolt and means operative to force said dog in a direction toward the axis of said bolt when pressure is applied to said nut in a direction to unscrew it from said bolt.

4. In a nut lock, the combination with a bolt having longitudinally extending V-shaped grooves, one wall of each of said grooves being flat and the other wall of each of said grooves being curved, an internally threaded nut having an aperture in its wall, a dog positioned in said aperture and having a toe adapted to engage said grooves, a spring partially embracing said nut and operative to constantly depress said dog and means coactive between said dog and said nut operative to force said dog toward the axis of said bolt when said nut tends to revolve in a direction to unscrew from said bolt.

5. In a nut lock, the combination with a bolt having longitudinally extending V-shaped grooves, one wall of each of said grooves being flat and the other wall of each of said grooves being curved, an internally threaded nut having an aperture in its wall, a recessed dog positioned in said aperture and having a toe adapted to engage said grooves, and a spring detachably engaging said dog in said recess and partially embracing said nut and operative to constantly depress said dog against said bolt and to permit said dog to ride on the curved walls of said grooves and on the surface of said bolt when the nut is rotated in one direction relative to said bolt.

6. In a nut lock, the combination with a bolt having a longitudinally extending groove, of an internally threaded nut adapted to engage said bolt and having an aperture and an external peripheral groove, of a recessed dog positioned in said aperture and adapted to engage said groove on said bolt, a spring disposed in said groove on said nut and in said recess and operative to depress said dog upon said bolt but detachable from said dog, and means whereby said dog may be lifted out of engagement with said bolt to permit said nut to be unscrewed therefrom.

7. In a nut lock, the combination with a bolt having a longitudinal groove, a nut, a member carried by said nut adapted to engage said groove and coacting means between said nut and member whereby said member is pressed toward the axis of the bolt when pressure tending to unscrew said nut from said bolt is applied to the nut.

8. In a nut lock, the combination of a bolt having a longitudinally extending V-shaped groove, one wall of the groove being flat and the other wall being curved, a nut, a member carried by the nut adapted to engage said groove, the nut and member having coöperative engaging surfaces whereby when the nut is moved in one direction the member rides on the curved wall of the groove and when the nut is turned in the opposite direction the member is forced toward the axis of the bolt to prevent rotation of the nut in said last-mentioned direction.

9. In a nut lock, the combination of a bolt having a longitudinal groove, a nut provided with a recess in one of its walls, a dog located in said recess adapted to engage said groove, means to retain the dog in operative position and means coacting with the dog operative to force said dog toward the axis of the bolt when the nut is turned in one direction.

10. In a nut lock, the combination of a bolt having a longitudinal groove, a nut provided with a recess in its bolt engaging wall, a dog located in said recess having a portion projecting into the groove in the bolt and a surface operatively engaging the recess in said nut, the shape of the coacting surfaces of the dog and nut being such as to tend to force said dog inwardly toward the center of the bolt when the nut is moved in one direction.

In witness whereof, I have hereunto set my hand this 9th day of August, A. D. 1916.

HUGH F. McGRATH.